United States Patent Office 3,454,391
Patented July 8, 1969

3,454,391
STIMULATION OF PLANT GROWTH
Bogislav von Schmeling, Hamden, Conn., and Marshall Kulka, Guelph, Ontario, Canada, assignors to Uniroyal, Inc., a corporation of New Jersey
No Drawing. Filed May 4, 1966, Ser. No. 547,406
Int. Cl. A01n 5/00, 21/02
U.S. Cl. 71—77                    7 Claims

---

ABSTRACT OF THE DISCLOSURE

Growth of plants is stimulated by applying a 2,3-dihydro - 5 - carboxamido - 6 - methyl-1,4-oxathiin of the formula

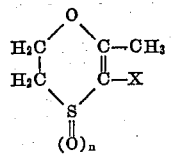

wherein X is a carboxamido (usually N-substituted) group and $n$ is 0, 1 or 2. Examples of the chemicals are 2,3 - dihydro-5-carboxanilido-6-methyl-1,4-oxathiin and 2,3 - dihydro - 5 - carboxanilido-6-methyl-1,4-oxathiin-4,4-dioxide. The chemicals increase the vegatative growth of pinto beans, produce greener color in barley leaves and increase the number of seed heads; peanut plants are increased in height.

---

This invention relates to the regulation of plant growth, in particular to the stimulation of plant growth by the action of a 2,3-dihydro-5-carboxamido-6-methyl-1,4-oxathiin of the formula

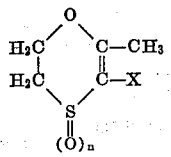

wherein X is a carboxamido (usually N-substituted) group and $n$ is zero, 1 or 2.

It is highly desirable to be able to stimulate the growth of plants, particularly from the standpoint of increasing agricultural productivity by decreasing the time required for a crop to mature and/or increasing the size or yield of the crop in a given period of time. Aside from cultural practices, including application of fertilizer, directed to increasing plant growth, it has been proposed to apply certain chemicals, one of which is gibberellic acid, for this purpose. However, such proposed chemical stimulants have enjoyed only limited acceptance, either because of limited effectiveness, or undue expense, or for other reasons.

It has now been discovered, in accordance with the present invention, that the growth of plants can be stimulated in a highly effective manner by applying to plant life, that is, to plants or seeds (either directly and/or to the soil in which the plant life is grown), a small but effective amount of a 2,3-dihydro-5-carboxamido-6-methyl-1,4-oxathiin of the formula stated above, typified by 2,3-dihydro-5-carboxanilido-6-methyl-1,4-oxathiin:

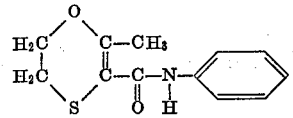

or its 4,4-dioxide (4-sulfone):

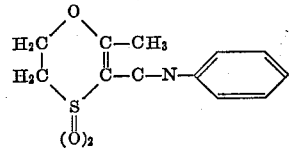

The plant growth regulants of the invention may be used for stimulating the growth of a wide variety of chlorophyll-producing plants, including monocotyledonous and dicotyledonous species grown for agricultural use or as ornamentals belonging to such plant families as Rosaceae, Solanaceae, Gramineae, Leguminosae, Malvaceae and Compositae.

The activity of the present plant growth stimulant is evidenced by such effects as increased height of the plants, increased number of leaves, increased length of internodes, increased weight, and increased ability to utilize nutrients in nutrient deficient or depleted soil as expressed by a dark green color of the leaves compared with chlorotic leaves of the untreated plants.

The chemical may be applied to seeds by tumbling the chemical with the seed, either alone or in admixture with a powdered solid carrier, to coat the seeds. Typical powdered solid carriers are the various mineral silicates, e.g. mica, talc, pyrophillite, and clays. The chemical may also be applied to the seeds in admixture with a conventionel surface-active wetting agent, with or without additional powdered solid carrier, as by first wetting the mixture with a small amount of water and then tumbling the seeds in the slurry. The surface-active wetting agents that may be used with the chemical may be any of the conventional anionic, nonionic, or cationic surface-active agents. Such surface-active agents are well known and reference is made to U.S. Patent No. 2,547,724, columns 3 and 4 for detailed examples of the same. As a seed treatment, the amount of the chemical coated on the seeds will be 2 to 8 ounces per hundred pounds of the seed. As a soil treatment the chemical may be applied as a dust in admixture with sand or dirt or a powdered solid carrier such as a mineral silicate, with or without an additional surface-active wetting agent, to the furrows with the planting of the seeds, or the chemical may be applied as an aqueous spray, if desired including a surface-active dispersing agent, or a surface-active dispersing agent and a powdered solid carrier, to the seed rows before, or with, or after planting the seeds. As a soil treatment, the amount of the chemical applied to the seed rows will be from 0.5 to 5 pounds per acre applied to the seed rows the equivalent of an area 2" wide and 2" deep to parallel rows in one direction a distance of 40" apart. Also, as a soil treatment, the chemical may be applied broadcast as a similar dust or aqueous spray with an application rate of 1 to 10 pounds per acre. As a foiliage treatment, the chemical may be applied to growing plants at a rate of 0.5 to 5.0 pounds per acre. Such application is generally as an aqueous spray which also contains a surface-active dispersing agent, or a surface-active dispersing agent and a powdered solid carrier.

In place of 2,3-dihydro-5-carboxamido-6-methyl-1,4-oxathiin or its 4,4-dioxide (sulfone) there may be employed any of the oxathiins or sulfones or sulfoxides thereof disclosed in U.S. Patent 3,249,499, May, 3, 1966, B. Von Schmeling et al., and copending application Ser. No. 506,606 filed Nov. 5, 1965 now U.S. Patent No. 3,402,241, in the names of B. Von Schmeling et al., the disclosures of which are hereby incorporated herein by reference to avoid repetition. Some examples of chemicals within the scope of our invention are:

[chemical structures]

Value of R: phenyl; o-tolyl; m-tolyl; p-tolyl; 2,3-dimethylphenyl; 2-ethylphenyl; 3-methoxyphenyl; alpha-naphthyl; 4-methoxyphenyl; 4-ethoxyphenyl; 3-bromophenyl; 3-chloro-2-methylphenyl; cyclohexyl; 2,5-dimethylphenyl; 2-methyl-4-methoxyphenyl; allyl; isopropyl; butyl; (R'=butyl); phenyl; (R'=methyl); phenyl; (R'=ethyl); and R'=H unless otherwise indicated.

Particular mention may be made of those chemicals of the above formula wherein R is selected from alkyl, cyclohexyl, phenyl, (or, equivalently, phenyl substituted with alkyl, alkoxy, or halogen), naphthyl, or allyl and R' is selected from hydrogen or alkyl. The above-mentioned Von Schmeling et al. patent makes particular mention of those chemicals wherein, when R is alkyl, it has from 1 to 10 carbon atoms, and makes particular mention of chemicals in which, when R is phenyl, such phenyl may be substituted with halogen (chlorine, bromine), lower alkyl or lower alkoxy.

The invention finds particular utility in connection with stimulating the growth of plants in what may be termed poor soil, particularly depleted soil or low fertility soil which lacks sufficient amounts of those elements required for good growth. While there are various ways of characterizing the fertility of soils, one convenient way is to measure the average total quantities of extractible nutrients in the soil, particularly nitrogen ($NO_3$ and $NH_4$), phosphorus and potassium. On this basis, soil having less than about 20 pounds per acre of $NO_3$ (as N), less than about 50 pounds per acre of $NH_4$ (as N), less than about 50 pounds per acre of phosphorus, and less than about 160 pounds per acre of potassium (average total quantities in upper six or eight inch layer, as determined by the procedure described in Bulletin 541 by the Connecticut Agricultural Experiment Station, 1950) may be considered on the low fertility side for the present purposes. Although control of fungus disease frequently is not a problem in low fertility soils nevertheless application of the present chemicals will be found to be remarkably advantageous, from the standpoint of stimulating the growth of the plants. Oftentimes the extent of the stimulation in poor soil is sufficient to overcome in whole or in part the retarding effect of the poor soil, so that results equivalent to, or in excess of, the results obtainable in higher fertility soil may be obtained simply by application of the present chemicals.

The following examples will serve to illustrate the practice of the invention in more detail.

EXAMPLE 1

Stimulation of pinto bean plants was noted as a result of employing the following techniques. 50 milligrams of 2,3-dihydro - 5 - carboxanilido-6-methyl-1,4-oxathiin are dissolved in 5 ml. of acetone. This solution plus 2 drops of Triton X–100 (isooctyl phenyl polyethoxy ethanol) wetting agent are brought up to 200 ml. with distilled water. This preparation represents 250 p.p.m. and is then thoroughly mixed in a Waring Blendor. 75 ml. of this concentration is then further diluted with 75 ml. of water for the 125 p.p.m. concentration. The chemical suspensions are then sprayed on duplicate pots, each containing 2 pinto bean plants which had previously been inoculated with bean rust. The spray application is made with a guntype sprayer delivering 2.5 ml. per second for 20 seconds. The plants are then placed in a chamber for 24 hours at 75° F. and 95–100% relative humidity. The plants are then placed in the greenhouse. Differences in growth begin to show up in three to four weeks.

Table I

Growth stimulation effect of 2,3-dihydro-5-carboxanilido-6-methyl-1,4-oxathiin as measured by ability to increase the amount of vegetative growth of pinto beans.

| | Measurements recorded 50 days after treatment | | |
|---|---|---|---|
| | 125 p.p.m. | 250 p.p.m. | Check |
| Average height in inches | 56.13 | 53.5 | 38.35 |
| Average No. of trifoliate leaves | 15 | 14.75 | 11.25 |
| Average length of the sum of 1st 4 internodes | 7.06 | 6.0 | 5.75 |
| Average fresh weight | 13.5 | 13.3 | 12.63 |

EXAMPLE 2

Confirmation of the ability to stimulate growth of pinto beans without the presence of disease organisms such as rust was achieved by the following technique.

50 milligrams of 2,3-dihydro-5-carboxanilido-6-methyl-1,4-oxathiin were dissolved in 5 ml. acetone and 1 drop of the surfactant Triton X–100 was added. This was then brought up to 200 ml. by adding distilled water to give the 250 p.p.m. dosage The 125 p.p.m. dosage was achieved by further dilution with water. These solutions were then sprayed on uniform pinto beans before the first trifoliates were fully expanded, six days after planting. Four replicate pots per treatment were sprayer, each pot containing two plants. The plants were placed, following treatment, in a chamber for 24 hours at 70° F. and 90% relative humidity and then returned to the greenhouse. Results were recorded four weeks after treatment.

Table II

Growth stimulation effect of 2,3-dihydro-5-carboxanilido-6-methyl-1,4-oxathiin as measured by its ability to increase the amount of vegetative growth of pinto beans.

| | 125 p.p.m. | 250 p.p.m. | Check |
|---|---|---|---|
| Average height in inches | 20.00 | 26.625 | 12.625 |
| Average number of trifoliates | 5.63 | 6.25 | 4.25 |
| Average fresh weight per plant in grams | 10.98 | 10.76 | 8.01 |
| Average length of the sum of the first four internodes | 5.84 | 7.66 | 5.31 |

As can be seen in Table II, growth stimulation of the bean plants was achieved obtaining a positive dosage response as compared with the results in Table I where the presence of the disease organisms may have interfered with the normal growth process.

EXAMPLE 3

This example demonstrates, in a field test conducted at Bethany, Conn., the ability of 2,3-dihydro-5-carboxanilido-6-methyl-1,4-oxathiin (Chemical A in Table III, below) and its sulfone, 2,3-dihydro-5-carboxanilido-6-methyl - 1,4 - oxathiin - 4,4 - dioxide (Chemical B in Table III, below) to produce greener color in barely leaves when applied as seed treatments. These chemicals in the same test also produced an increased number of barley seed heads as compared with the untreated control. The test procedure used and the results obtained were as follows: 62 mg. chemical were tumbled in an 8 oz. glass jar for 45 minutes with 50 gr. barley seed. This chemical amount is equivalent to a rate of 2 oz. per 100 lb. seed. A dossage series of 2, 4 and 8 oz. per 100 lb. was prepared accordingly. The barley seed variety, Larker, was used in the experiment which was infected with the loose smut organism *Ustilago nuda*.

The seed was planted in early spring in replicated 25 ft. row plots using 10 gr. of seed per plot. Normal cultural practices were employed during the growing season in keeping the plots free of weeds and insects. About 11 weeks later, results on disease control and general appearance of the barley growth were taken.

Quantitative differences were obtained by counting the number of seed heads in each plot. The results are shown in the following table:

TABLE III.—BARLEY SEED TREATMENT FIELD TEST

| Chemical | Oz./100 lbs. | Percent increase of No. of seed heads | Percent infection |
| --- | --- | --- | --- |
| A | 2 | 14.1 | 1.9 |
| A | 4 | 10.4 | 0.7 |
| A | 8 | 7.5 | 0.0 |
| B | 2 | 12.2 | 14.5 |
| B | 4 | 9.6 | 12.5 |
| B | 8 | 5.7 | 8.9 |
| Untreated check | | 0 | 17.5 |

Chemical A is 2,3-dihydro-5-carboxanilido-6-methyl-1,4-oxathiin; Chemical B is 2,3-dihydro-5-carboxanilido-6-methyl-1,4-oxathiin-4,4-dioxide. The results show that not only effective disease control was obtained but also that the number of barley seed heads was markedly increased indicating a growth stimulatory influence by these chemicals.

EXAMPLE 4

100 grs. of barley seed were treated with 0.248 gr. of 2,3-dihydro-5-carboxanilido-6-methyl-1,4-oxathiin. This treatment is equivalent to 4 oz./100 lbs. of seed.

Soil mixtures were prepared as follows using greenhouse potting soil which is known to be deficient in nitrogen, phosphorous and potassium. Lime was added (30 gr. to 30 lbs. of soil) to neutralize the pH. The fertilizer used was 5-10-10 plus 20% added super phosphate.

Soil #2—29 lbs. soil+1 lb. sand+no additional fertilizer.
Soil #3—29 lbs. soil+1 lb. sand+7.5 gr. fertilizer.
Soil #4—29 lbs. soil +1 lb. sand+15 gr. fertilizer.

Five seeds were planted per 4″ pot with six replications of treated and untreated seeds in each soil type. The pots were then placed in saucers for subirrigation and placed in the greenhouse. Random placement was used to prevent bench effect variable.

Observations were made 11 and 17 days after planting and injury due to nutritional deficiency was recorded.

This injury included the typical effects such as chlorosis and necrosis.

TABLE IV.—BARLEY SEED TREATMENT GREENHOUSE TEST IN LOW FERTILITY SOIL

| | | Percent injury due to nutrient deficiency | |
| --- | --- | --- | --- |
| Days after planting | Soil No. | Untreated | Treated |
| 11 | 2 | 50 | 0 |
| 17 | 3 | 20 | 0 |
| 17 | 4 | 0 | 0 |

EXAMPLE 5

250 milligrams chemical are dissolved in 5 ml. acetone, 30 mg. Triton X-100 and 45 ml. water to give a chemical concentration of 5000 p.p.m. This preparation is sprayed to run-off with a DeVilbis atomizer on duplicate peanut plants. The plants are then kept for 24 hours in a control chamber at 75° F. and 95% relative humidity. After this time the plants are returned to the greenhouse for a four week period. At this time height measurements are made and recorded. The following results were obtained:

TABLE V.—PEANUT GROWTH STIMULATION

| Chemical | P.p.m. | Percent height increase over untreated check |
| --- | --- | --- |
| 2,3-dihydro-5-(N-isopropyl) carboxamido-6-methyl-1,4-oxathiin-4,4-dioxide. | 5,000 | 27 |
|  | 2,000 | 20 |
| 2,3-dihydro-5-N,N-dibutyl carboxamido-6-methyl-1,4-oxathiin-4,4-dioxide. | 5,000 | 13 |
|  | 2,000 | 0 |

Have thus described our invention what we claim and desire to protect by Letters Patent is:

1. A method of stimulating the growth of plants comprising applying thereto a 2,3-dihydro-5-carboxamido-6-methyl-1,4-oxathiin having the formula:

$$\begin{array}{c} H_2C \diagup\!\!\!\diagdown C-CH_3 \\ | \quad\quad\quad || \\ H_2C \diagdown\!\!\!\diagup C-X \\ S \\ ||\\ (O)_n \end{array}$$

wherein X has the formula $$-\underset{\underset{O}{||}}{C}-\underset{\underset{R'}{|}}{N}-R$$

wherein R is selected from alkyl having up to 10 carbon atoms, cyclohexyl, phenyl, naphthyl, allyl, and phenyl substituted with lower alkyl, lower alkoxy, or halogen, and R' is selected from hydrogen and lower alkyl, and $n$ is selected from zero, 1 and 2, in amount sufficient to stimulate the growth of the plant.

2. A method as in claim 1, wherein the plants are free of fungus disease.

3. A method as in claim 1, wherein the said plants are grown in soil which has less than about 20 pounds per acre of $NO_3$ (as N), less than about 50 pounds per acre of $NH_4$ (as N), less than about 50 pounds per acre of phosphorus, and less than about 160 pounds per acre of potassium.

4. A method as in claim 1 in which the chemical is 2,3-dihydro-5-carboxanilido-6-methyl-1,4-oxathiin.

5. A method as in claim 1 in which the chemical is 2,3-dihydro-5-carboxanilido-6-methyl-1,4-oxathiin-4,4-dioxide.

6. A method as in claim 1 in which the chemical is 2,3-dihydro-5-(N-isopropyl)carboxamido-6-methyl-1,4-oxathiin-4,4-dioxide.

7. A method as in claim 1 in which the chemical is 2,3-dihydro-5-(N,N-dibutyl)carboxamido-6-methyl-1,4-oxathiin-4,4-dioxide.

References Cited

UNITED STATES PATENTS

| 2,678,878 | 5/1954 | Stewart | 71—77 |
| 3,066,149 | 11/1962 | Slezak et al. | 71—91 |
| 3,072,675 | 1/1963 | Strycker | 71—91 |
| 3,249,499 | 5/1966 | Von Schmeling et al. | |

FOREIGN PATENTS 860,380  2/1961  Great Britain.

LEWIS GOTTS, *Primary Examiner.*

G. HOLLRAH, *Assistant Examiner.*

U.S. Cl. X.R.

71—90, 91; 260—327; 424—276